F. GROSJEAN.
Handle for Sheet-Metal Vessel or Utensil.

No. 202,540. Patented April 16, 1878.

Attest:
H. D. Perrine
J. A. Rutherford

Florian Grosjean,
Inventor.
By James L. Norris,
Atty.

UNITED STATES PATENT OFFICE.

FLORIAN GROSJEAN, OF NEW YORK, N. Y., ASSIGNOR TO LALANCE & GROSJEAN MANUFACTURING COMPANY, OF SAME PLACE.

IMPROVEMENT IN HANDLES FOR SHEET-METAL VESSELS OR UTENSILS.

Specification forming part of Letters Patent No. 202,540, dated April 16, 1878; application filed March 16, 1878.

*To all whom it may concern:*

Be it known that I, FLORIAN GROSJEAN, of New York city, in the county of New York and State of New York, have invented certain new and useful Improvements in Handles for Sheet-Metal Fire-Shovels, &c., of which the following is a specification:

This invention relates to an improvement in the handles of struck-up sheet-metal vessels and utensils the bodies and handles of which are formed in one piece, the handles being strengthened by each having formed therein a longitudinal rib extending through the entire length thereof, and partially across the side or wall of the vessel or utensil of which the said handle forms a part.

This improvement is applicable to coal-shovels, sauce-pans, frying-pans, ladles, spoons, and similar household articles having their handles formed as above described; and its object is to strengthen said handles at their junctions with the bodies, and give them a rounded shape convenient for grasping by the hand; and to this end it consists in a sheet-metal vessel or utensil having formed in one piece therewith a handle having attached to its under side a concavo-convex sheet-metal brace or shell, the longitudinal edges of which are folded over the adjacent edges and closely upon the opposite margins of the upper side of said handle, while the inner end of said shell rests against and is riveted to the outer surface of the vessel or utensil, and firmly braces the junction of the same and its handle by opposing to any downward strain upon the bowl or body of said vessel or utensil the resistance afforded by the compression of its entire end and of the brace, while at the same time the complete handle is given a neat appearance and convenient shape for grasping by the hand.

Figure 1:
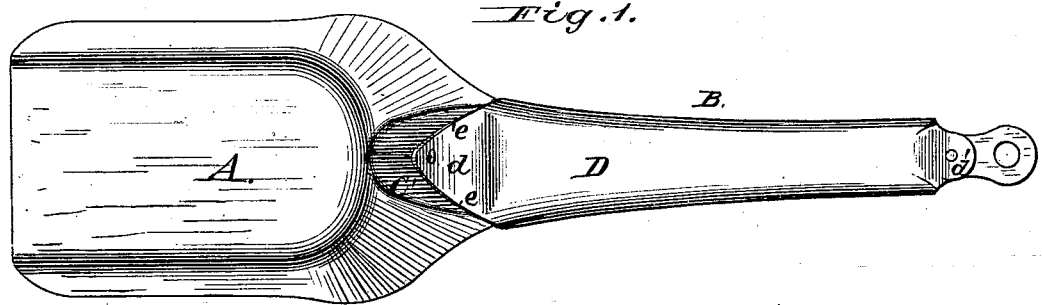
Figure 2:
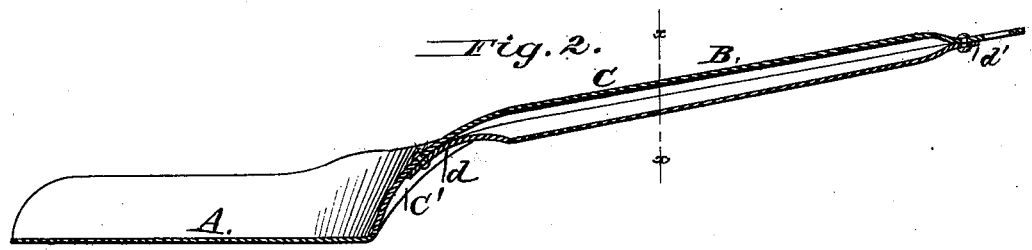
Figure 3:
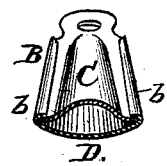
Figure 4:
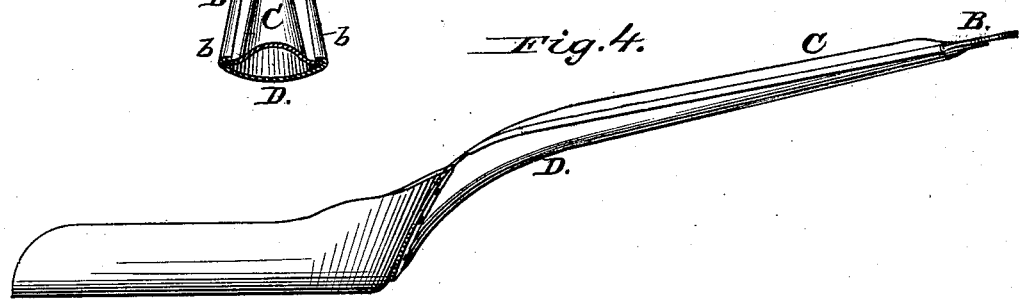

In the accompanying drawing, Figure 1 is a bottom view of a coal-shovel the handle and body of which are struck up from a single piece, the handle being formed with an upward-projecting longitudinal groove, which extends across the wall of the shovel, and is provided with my improvement. Fig. 2 is a section taken on line $x\,x$, Fig. 1. Fig. 3 is a cross-section of the handle. Fig. 4 shows a modification of my improvement.

The letter A designates the body of the shovel, and B is its handle, both being struck up from a single piece of sheet metal. C indicates a hollow rib extending lengthwise of the handle and across the back wall of the body of the shovel. Said rib projects upwardly with respect to the handle, and inwardly with respect to the body of the shovel, giving said handle approximately a U or horseshoe shape in cross-section. D is a shell of sheet metal, having the same general shape of the handle, and having its inner end flat and pointed, as shown at $d$, and its outer end also flat and pointed, as shown at $d'$.

The longitudinal edges of this shell are bent over the edges and closely upon the opposite margins of the upper side of the handle B, as shown at $b$, firmly attaching the said shell to the under side of the said handle, giving it a rounded shape convenient for grasping by the hand. The inner pointed end of said shell extends partially across the outer surface of the back wall of the shovel, and is riveted thereto within the depression or concavity resulting from the form of the lip C', the oblique edges $e$ of said end resting against said back wall, and serving to brace the junction of the handle and body of the shovel.

It will be seen that downward strain upon the body of the shovel occasions a mainly longitudinal compression upon the entire inner end of the shell or brace, instead of the partial tensile strain which would result were the brace or shell arranged on top of the handle with its inner end projecting within the body or bowl and riveted to the inner surface thereof, in which case the bracing strain is all upon the rivet, tending to tear it from its holes.

The outer flat end of the shell is riveted to the handle.

In the drawing the inner end of the shell is represented as extending only partially across the back wall of the shovel; but, if it is desired to give extra strength to the junction of the handle and body of any vessel or utensil, this end may extend entirely across the wall, and may be formed concave, as shown in Fig. 4.

A sheet-metal-vessel handle has heretofore been braced by having attached to its top side a shell the inner end of which extends within and is riveted to the inner surface of the vessel, so that downward strain upon the vessel is resisted by the rivet, as illustrated in the patent of Edgar and Bardell, granted January 5, 1875, No. 158,478. A handle has also been braced by a sheet-metal strip or plate folded closely around it for a portion of its length, and having a projection extending partially across the body or bowl, as shown in P. Lesson's patent of October 30, 1877, No. 196,683.

Having now fully described my invention, I claim—

A sheet-metal vessel or utensil having formed in one piece therewith a handle having attached to its under side a concavo-convex sheet-metal brace or shell, the longitudinal edges of which are folded over the adjacent edges and closely upon the opposite margins of the upper side of said handle, while the inner end of said shell rests against and is riveted to the outer surface of the vessel or utensil, substantially as and for the purpose set forth.

In testimony that I claim the foregoing I have hereunto set my hand in the presence of the subscribing witnesses.

F. GROSJEAN.

Witnesses:
    THOMAS COCHRAN,
    JAS. COCHRAN.